United States Patent
Dube et al.

(10) Patent No.: US 9,571,165 B2
(45) Date of Patent: Feb. 14, 2017

(54) NFC COMMUNICATION WITH AN INFORMATION HANDLING SYSTEM SUPPLEMENTED BY A MANAGEMENT CONTROLLER AND ADVERTISED VIRTUAL TAG MEMORY

(71) Applicant: Dell Products L.P., Round Rock, TX (US)

(72) Inventors: Shawn J. Dube, Austin, TX (US); Syed S. Ahmed, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 14/259,574

(22) Filed: Apr. 23, 2014

(65) Prior Publication Data

US 2015/0311957 A1    Oct. 29, 2015

(51) Int. Cl.
*H04B 5/00* (2006.01)

(52) U.S. Cl.
CPC .......... *H04B 5/0056* (2013.01); *H04B 5/0031* (2013.01)

(58) Field of Classification Search
USPC ................................. 455/41.1, 41.2
See application file for complete search history.

(56) References Cited

U.S. PATENT DOCUMENTS

| | | | |
|---|---|---|---|
| 4,270,168 A | 5/1981 | Murphy et al. | |
| 6,701,460 B1 | 3/2004 | Suwandi et al. | |
| 7,225,239 B2 | 5/2007 | King et al. | |
| 7,321,312 B1 | 1/2008 | Garnett | |
| 7,516,025 B1 | 4/2009 | Williams et al. | |
| 7,561,875 B1 | 7/2009 | Eberle | |
| 7,890,677 B2 * | 2/2011 | Chandrasekhar | G06F 3/023 709/203 |
| 7,934,054 B1 * | 4/2011 | Moll | G06F 1/3203 345/541 |
| 8,116,759 B2 | 2/2012 | Ying | |
| 8,321,922 B1 | 11/2012 | Lo et al. | |
| 9,055,120 B1 | 6/2015 | Firman | |
| 2002/0138235 A1 | 9/2002 | Edwards et al. | |
| 2003/0127067 A1 | 7/2003 | Karnes | |
| 2003/0191877 A1 | 10/2003 | Zaudtke et al. | |
| 2006/0248407 A1 | 11/2006 | Adams, Jr. et al. | |
| 2008/0042830 A1 * | 2/2008 | Chakraborty | G06K 7/0008 340/540 |
| 2008/0081608 A1 | 4/2008 | Findikli et al. | |

(Continued)

*Primary Examiner* — Edward Urban
*Assistant Examiner* — Ralph H Justus
(74) *Attorney, Agent, or Firm* — Terrile, Cannatti, Chambers & Holland, LLP; Robert W. Holland

(57) ABSTRACT

Near Field Communication (NFC) supports server information handling system management through communication between a mobile information handling system and a baseboard management controller. Enhanced transfer by NFC of management information is provided by manipulating the NFC tag memory assigned for information transfer with the aid of a microcontroller coordinating NFC transfers at the baseboard management controller, such as with coordinated storage operations at a tag memory an supporting processors/microcontrollers. The microcontroller manages tag memory and/or system memory so that the portable information handling system writes and reads information beyond the capabilities of unaided tag memory.

20 Claims, 8 Drawing Sheets

(56) References Cited

U.S. PATENT DOCUMENTS

| | | | |
|---|---|---|---|
| 2008/0300009 A1* | 12/2008 | Quinn | H01Q 1/2258 455/553.1 |
| 2009/0279673 A1 | 11/2009 | Maffre et al. | |
| 2010/0042571 A1 | 2/2010 | Dobbins et al. | |
| 2010/0178868 A1* | 7/2010 | Charrat | G06Q 20/3278 455/41.1 |
| 2010/0277866 A1 | 11/2010 | Chen | |
| 2011/0312272 A1* | 12/2011 | Goto | G08C 17/02 455/41.1 |
| 2012/0261479 A1* | 10/2012 | Moore | G06K 7/0008 235/492 |
| 2012/0289155 A1* | 11/2012 | Dua | G06F 17/30058 455/41.1 |
| 2012/0290886 A1 | 11/2012 | Wilson, Jr. | |
| 2012/0309302 A1* | 12/2012 | Buhot | H04B 5/00 455/41.1 |
| 2012/0315848 A1 | 12/2012 | Smith et al. | |
| 2013/0124346 A1 | 5/2013 | Baldwin et al. | |
| 2013/0179558 A1* | 7/2013 | Lin | H04L 41/04 709/223 |
| 2013/0215467 A1 | 8/2013 | Fein et al. | |
| 2013/0252543 A1* | 9/2013 | Badi | G06F 15/17337 455/41.1 |
| 2013/0332363 A1 | 12/2013 | Renard et al. | |
| 2014/0045426 A1 | 2/2014 | Cho | |
| 2014/0074346 A1 | 3/2014 | Chiaverini | |
| 2014/0074537 A1 | 3/2014 | Bargetzi et al. | |
| 2014/0107886 A1 | 4/2014 | Miljkovic et al. | |
| 2014/0154979 A1 | 6/2014 | Tomas et al. | |
| 2014/0235162 A1 | 8/2014 | Gallo et al. | |
| 2014/0256251 A1 | 9/2014 | Caceres et al. | |
| 2014/0329467 A1 | 11/2014 | Ewing et al. | |
| 2015/0017911 A1 | 1/2015 | Liu | |
| 2015/0046748 A1 | 2/2015 | Uchida | |
| 2015/0081538 A1 | 3/2015 | Renard et al. | |
| 2015/0089221 A1 | 3/2015 | Taylor et al. | |
| 2015/0140986 A1 | 5/2015 | Lamb et al. | |
| 2015/0149320 A1 | 5/2015 | Smirin | |
| 2015/0186871 A1 | 7/2015 | Laracey | |
| 2015/0222663 A1* | 8/2015 | Patange | H04B 5/0062 726/1 |

* cited by examiner

NFC COMMUNICATION WITH AN INFORMATION HANDLING SYSTEM SUPPLEMENTED BY A MANAGEMENT CONTROLLER AND ADVERTISED VIRTUAL TAG MEMORY

CROSS REFERENCE TO RELATED APPLICATION

U.S. patent application Ser. No. 14/259,541, entitled "NFC Communication with an Information Handling System Supplemented by a Management Controller" by inventors Arulnambi Raju and Sudhir V. Shetty, filed on Apr. 23, 2014, describes exemplary methods and systems and is incorporated by reference in its entirety.

BACKGROUND OF THE INVENTION

Field of the Invention

The present invention relates in general to the field of information handling system wireless communication, and more particularly to near field communication (NFC) with an information handling system supplemented by a management controller.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many enterprises have turned to network-based "cloud" infrastructures to manage information processing requirements. A typical cloud infrastructure attempts to balance processing demands and processing resources by allocating processing tasks across generally generic server information handling systems. For example, a typical cloud infrastructure is a farm of server information handling systems that reside in a datacenter with server tasks assigned through migration of virtual machines between physical resources. In such a cloud infrastructure, the actual physical location of a virtual information handling systems is often difficult to track and generally irrelevant. Often, a datacenter will support multiple enterprises in different "virtual" cloud networking environments that run on the same physical server information handling systems.

One concern that arises with cloud networking is maintaining security for data associated with different entities that share hardware resources. Generally, the cloud infrastructure uses data structures, encryption and password protection to maintain separation of data through network accesses. These techniques also help to restrict access of data when an end user has a physical interface to server information handling systems within a datacenter, such as a datacenter technician. For instance, physical resources within a server information handling system are often managed by a baseboard management controller (BMC) that does not have access to virtual machines running on the server information handling system. Data center technicians interact with the BMC through a management network interface or a direct cable connection. The BMC allows a datacenter technician to monitor the status of physical resources and to configure the physical resources to interact with the cloud infrastructure, such as with network address and other settings.

Generally, communications with the BMC are kept secure and separate from communications through the cloud. Restricting BMC communications helps to prevent malicious accesses that could reconfigure a server information handling system or cause damage to components within the server information handling system. Typically, management network communications take place though wired interfaces, such as an Ethernet cable that connects to a local area network (LAN). In some instances, BMC communications are supported through wireless communications, such as a wireless local area network (WLAN). Generally, however, security requirements limit the ability to use WLAN communications with a server information handling system and the management network associated with a BMC. Wireless networking in a server information handling system data center creates a security risk in that unauthorized individuals might sniff wireless communications or even hack into the server through the wireless network.

One alternative to wireless networking in a server information handling system data center to communicate with a BMC is to include a near field communication (NFC) device that interfaces with the BMC. Mobile telephones that include NFC can communicate directly with the BMC through short range wireless signals that present minimal security risk since the NFC wireless signals do not carry to a distance that would extend beyond a typical datacenter secure area. However, NFC has limited bandwidth for communicating information and generally requires placement of the two communicating NFC devices in close proximity to each other. For example, a typical NFC "tag" memory space has only 3k of flash memory that is reloaded for each transmission or reception of data. As a result, an end user generally has to hold a mobile telephone in close proximity to a server information handling system NFC device for an extended time in order to communicate a meaningful amount of information.

One difficulty that arises with management of server information handling systems by NFC is that some server management data changes frequently and is thus constantly updated, such as system health and hardware logs. In order to ensure that the most recent data is available from an NFC device, this data would need frequent updates to the tag memory of the NFC device, which tends to wear internal flash memory used for tag memory. Other difficulties include ensuring that an NFC transaction has proper authorization with the BMC and ensuring that content is synchronized between NFC access to a BMC and other types of access, such as through a conventional management network interface Although NFC transactions might be arranged to provide the same access to management information at a BMC as is available through conventional management networks, NFC transaction tend to take more time than conventional network communications and sometimes involve holding a portable information handling system in an awkward position within close proximity to an NFC device that can lead to end user discomfort.

SUMMARY OF THE INVENTION

Therefore a need has arisen for a system and method which supplements an NFC communication device with a management controller to increase NFC data transmission efficiency.

A further need exists for a system and method which manages NFC transactions through virtual tag file locations managed by a server information handling system management subsystem to support reads by an external NFC device.

In accordance with the present invention, a system and method are provided which substantially reduce the disadvantages and problems associated with previous methods and systems for communication of data with an NFC communication device. A microcontroller manages NFC transceiver memory for reads and writes that selectively adapt NFC transactions to a virtual tag size. An external NFC device uses selectable tag memory sizes advertised by the microcontroller managed NFC transceiver. Microcontroller memory is partitioned by a server information handling system baseboard management controller (BMC) to provide a virtual tag memory view for NFC reads and writes by the external NFC device.

More specifically, a server information handling system includes a server management subsystem having a baseboard management controller (BMC) to manage processing components of the server information handling system. An NFC device integrated with the server management subsystem interfaces the BMC with an external NFC device of a portable information handling system, such as a smartphone, so that the portable information handling system performs management functions at the BMC with NFC communication transactions. A microcontroller interfaces the BMC with the integrated NFC device and selectively modifies memory accessed by an NFC transceiver of the integrated NFC device to provide increased NFC transaction sizes and transfer rates. Reading and writing cues provided as configuration information to an external NFC device define a tag memory of greater than the actual tag memory associated with the NFC transceiver. The microcontroller manages memory usage by the NFC transceiver, such as by forwarding writes received by the NFC transceiver to memory external to the tag memory and by providing the NFC transceiver information to respond to read requests from memory external to the tag memory.

In one embodiment, a BMC defines file locations in a microcontroller memory so that a virtual tag memory maps to physical memory locations in the microcontroller. An external NFC device references the file locations to select and retrieve desired management information with NFC transactions serviced by a server subsystem NFC transceiver controlled by the microcontroller. The BMC defines file locations so that management information that is frequently updated, such as maintenance logs for the server and the server components, are kept in microcontroller RAM while less frequently updated information, such as server identification information, are kept in microcontroller flash memory. In order to maintain concurrency of data in the microcontroller, data is locked during reads for NFC transactions so that writes are not made to files when a read is in progress. Security is ensured by requiring LDAP security, such as user name and password inputs, before NFC transactions that transfer server data are permitted.

The present invention provides a number of important technical advantages. One example of an important technical advantage is that NFC communications are performed more efficiently with more rapid transfer rates and greater quantities of data transferred in a single NFC communication. A microcontroller manages NFC transfers with support from memory outside the NFC device so that the effective memory of an NFC tag is practically unlimited. By coordinating reads and writes through an address translation, the microcontroller effectively creates a dual ported memory for the NFC tag to support complex and rapid data transfers for server information handling system configuration. Memory locations in the microcontroller are mapped to a virtual tag view by a server BMC so that the BMC and external NFC devices can read and write selected data in efficient NFC transactions. By allocating different types of information to persistent and non-persistent memory, interruptions to the BMC are reduced, such as when static information like IP addresses are requested that does not require BMC inputs. Thus, the BMC is better able to focus resources at management tasks without servicing the NFC transceiver for responses that the microcontroller handles on its own with persistently stored information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

NFC transactions are supported at a server information handling system BMC with microcontroller memory managed by the BMC. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
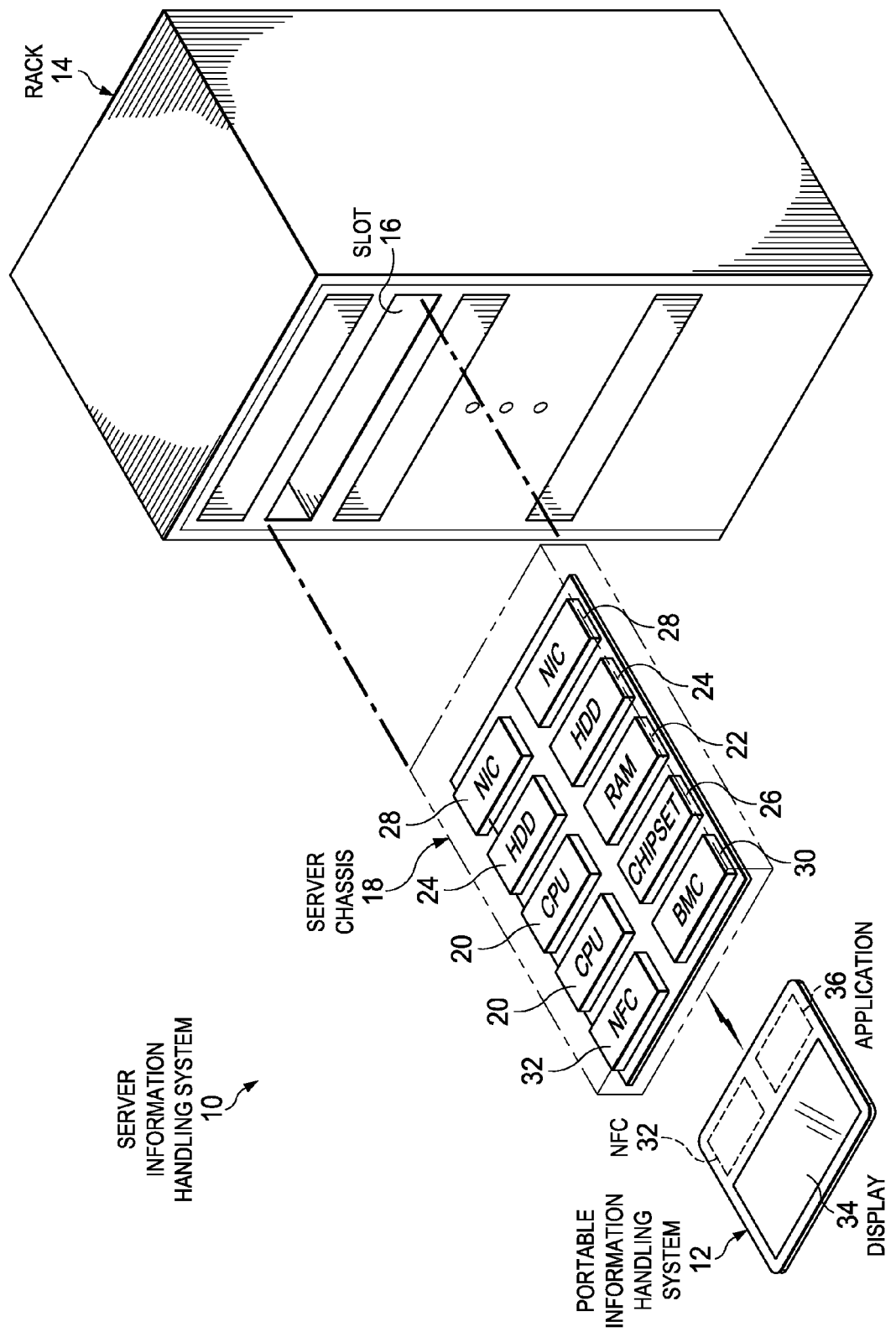
FIG. 1 depicts a server information handling system having management support through an NFC interface with a portable information handling system.

Referring now to FIG. 1, a server information handling system 10 is depicted having management support through an NFC interface with a portable information handling system 12. In the example embodiment, server information handling system 10 is disposed in a server information handling system rack 14 at a slot 16. Rack 14 provides power and communication infrastructure to a plurality of slots 16 to support a plurality of server information handling systems 10. Each server information handling system 10 has a chassis 18 that holds processing components for performing server processing functions, such as a one or more central processing units (CPUs) 20 to execute instructions, random access memory (RAM) 22 to store instructions, hard disk drives (HDD) 24 to provide persistent storage, a chipset 26 having firmware to coordinate operations of the processing components, and one or more network interface cards (NIC) 28 to provide network communications. A baseboard management controller (BMC) 30 manages operation of the processing components with communications supported through a management network interface, sometimes referred to as an out-of-band or management network. BMC 30 allows remote management of server operations, such as remote start-ups, remote shut downs, and remote firmware upgrades or other types of maintenance.

A near field communication (NFC) device 32 interfaces with BMC 30 to provide server management support through NFC wireless transmissions provided by a portable information handling system 12. For example, portable information handling system 12 accepts management settings through a touchscreen display 34 that presents an interface generated by an application 36 running on portable information handling system 12. Application 36 coordinates communication of server management information through an NFC device 32 of portable information handling system 12 to NFC device 32 of server information handling system 10. Although BMC 30 is capable of performing substantially the same management tasks through NFC transactions as it can perform through a management network supported by a NIC 28, data transfer rates for conventional NFC transactions tends to take place at a slower pace with NFC transactions. To improve data transfer rates, NFC device 32 in server information handling system 10 adjusts NFC transactions to occur more efficiently both with and without prior coordination of NFC device 32 and application 36 in portable information handling system 10. As an example, typical NFC transactions are supported in a maximum of 10 KB increments based upon the size of tag memory within each NFC device 32, however, server management NFC transactions are supported in 100 KB or greater increments by, in essence, spoofing the NFC transceivers to view available tag memory as greater than actual tag memory. Memory can be written in any size memory increments with a spoofing-type of memory rolling pages mechanism in which tag physical memory is looped back on itself and re-used as the microcontroller reads incoming data from tag memory locations. Although, in such an embodiment, tag memory has a limited physical size, the re-use of tag memory allows presentation of a larger virtual memory size to the external NFC device. Larger and more efficient NFC transactions may be coordinated by compatible NFC devices 32 that share transfer toolboxes, or may be induced from one device by providing tag memory configuration information that differs from actual tag memory configuration, as set forth below.

Figure 2:
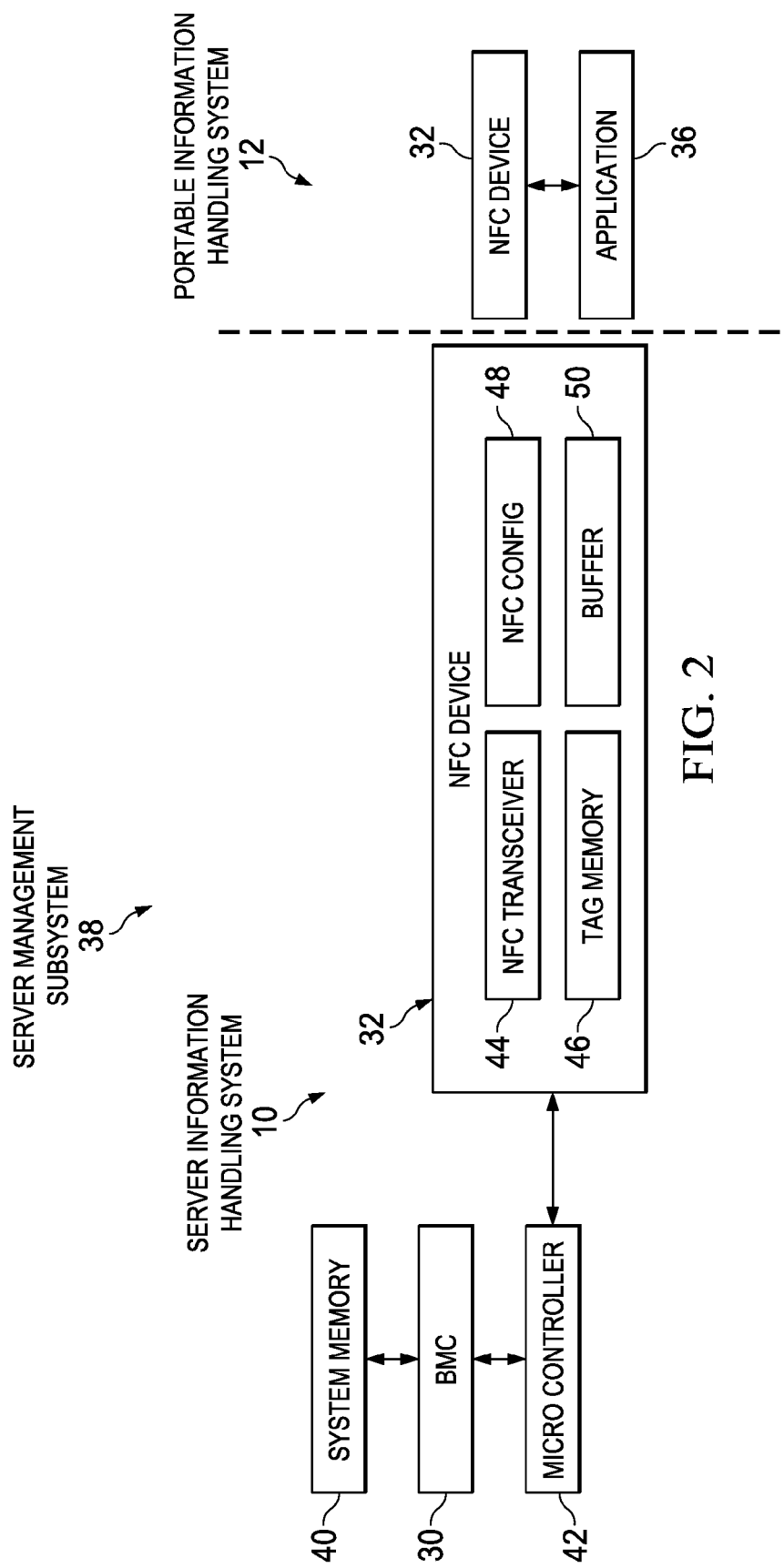
FIG. 2 depicts a block diagram of a server management subsystem with NFC interface support.

Referring now to FIG. 2, a block diagram depicts a server management subsystem 38 with NFC interface support. BMC 30 controls management functions at server management subsystem 38 and has access to system memory 40, which can include RAM or flash memory local to BMC 30, RAM or persistent memory local to the managed server information handling system, or network storage accessed through a network interface. A microcontroller 42 interfaces BMC 30 with NFC device 32 to coordinate management functions performed through NFC transactions. NFC device 32 includes an NFC transceiver 44 with a conventional tag memory 46 and NFC configuration information 48 to support conventional NFC transactions. For example, NFC devices 32 of server information handling system 10 and portable information handling system 12 exchange NFC configuration information 48 and then communicate data in increments indicated by the size of tag memory 46.

Microcontroller 42 provides enhanced NFC transaction sizes and transfer rates by selectively altering NFC configuration information 48 to have values different from the values used for access to tag memory 46. In one embodiment, microcontroller 42 sets a flag to indicate the availability of enhanced NFC transactions to application 36. If application 36 has logic to employ enhanced NFC transactions, the application 36 coordinates with microcontroller 42 to establish appropriate NFC transaction parameters. However, microcontroller 42 effectively alters the nature of NFC transactions with server-side logic in the event that application 36 lacks inherent capabilities. In a concurrent mode of operations, microcontroller 42 reads and writes information to tag 46 concurrent with NFC transceiver 44 reading and writing information at tag 46 in support of NFC transactions. In the concurrent mode of operations, microcontroller 42 sets tag size in NFC configuration 48 so that an external NFC device 32 reads and writes NFC transactions in excess of the actual size of tag memory 46. As the NFC transaction takes place at NFC transceiver 44, microcontroller 42 accesses tag memory 46 to read and/or write information, thus allowing reuse of tag memory 46 during the NFC transaction. Reading and writing cues provided by NFC configuration information 48 include tag memory address information that differs from actual tag memory address information, such as address and size for a tag memory for any range supported by microcontroller 42, or selectable address ranges supported by microcontroller 42. Reading and writing cues may be recognized by an external NFC device 32 as an indication of support for altered NFC transactions to adapt the NFC transactions appropriately, or may simply be adopted as the actual tag memory used by the external NFC device.

In one embodiment, microcontroller 42 manages tag memory 46 accesses for reads and writes by controlling information at buffers 50 that store information between NFC transceiver 44 and tag memory 46. In a write forwarding mode, tag writes are pushed from tag memory 46 (or directly from buffer 50 before a write to tag memory 46) to an address range external to tag memory 46. For example, microcontroller 42 sets NFC configuration 48 to have a tag memory size in excess of the actual size of tag memory 46, and then pushes writes to the tag memory 46 directly to memory external tag memory 46 (or to re-used tag memory) that has adequate size for storing the NFC read or write transaction. Write forwarding may send information to RAM or flash memory of microcontroller 42, to memory associated with BMC 30 or even to network memory external to server information handling system 10. Similarly, microcontroller 42 coordinates a remote read mode so that NFC writes from NFC transceiver 44 are supported by memory external to tag memory 46. For example, NFC configuration 48 has a larger tag memory size set than is in fact available from tag memory 46, however, reads by an external NFC device 32 are supported by feeding information for the read from microcontroller 42 instead of or in addition to from tag memory 46. In combination, write forwarding and remote reads as set forth above allow an NFC device to have essentially an infinite virtual tag memory size. To track NFC transactions, microcontroller 42 maintains a virtual to physical address space to remap blocks of physical tag memory to a virtual address space. By continually updating the map with read and write cues, microcontroller 42 defines an infinite tag memory that relies on reuse of tag memory blocks or use of memory external to tag memory 46.

In one embodiment, a tag memory presents an infinite or very larger virtual tag memory size to an external device and maintains data during NFC transactions by looping the tag memory page over itself. For example, a 10 byte tag memory presents itself as having an unlimited or very large size, such as 1 MB. An external NFC device interfacing with the tag memory uses tag memory with reads/writes through the physically-available 10 bytes of memory. At the $11^{th}$ byte, tag memory loops back to the first memory byte location, with data previously written to that location already moved to memory outside the tag memory. The external NFC device reads/writes at the first byte through the $10^{th}$ byte while viewing the tag memory as and $11^{th}$ through $20^{th}$ byte. The tag memory continues to loop its memory locations to provide a memory size needed by the external NFC device to complete a read/write transaction. The microcontroller manages virtual tag memory size by mapping the physical memory address of the looped tag memory to a location external to the tag memory. Alternatively, in one embodiment, tag memory itself automatically implements looping by reading and writing to buffers as writes/reads take place to the tag memory. Reads and writes to tag memory are managed to ensure that data in a tag memory location is read or written by an NFC transaction before the memory location is re-used by a looping operation. For example, in one embodiment an interrupt service routine (ISR) mechanism manages tag memory location re-use. As soon as a defined amount data, such as a defined data block, is modified by an external NFC device, the tag memory notifies an external microcontroller of the availability of the memory block. The microcontroller then asserts a GPIO to let the tag memory know that the microcontroller is reading or writing, with the GPIO asserted while the microcontroller is active to ensure the tag will not overwrite memory blocks in a looping operation. In an alternative embodiment, a lock register is used for the tag memory to check before accessing and overwriting existing data in a data block. Similar mechanisms may be used when a BMC or a microcontroller is trying to access data that is being modified by an external NFC device.

Figure 3:
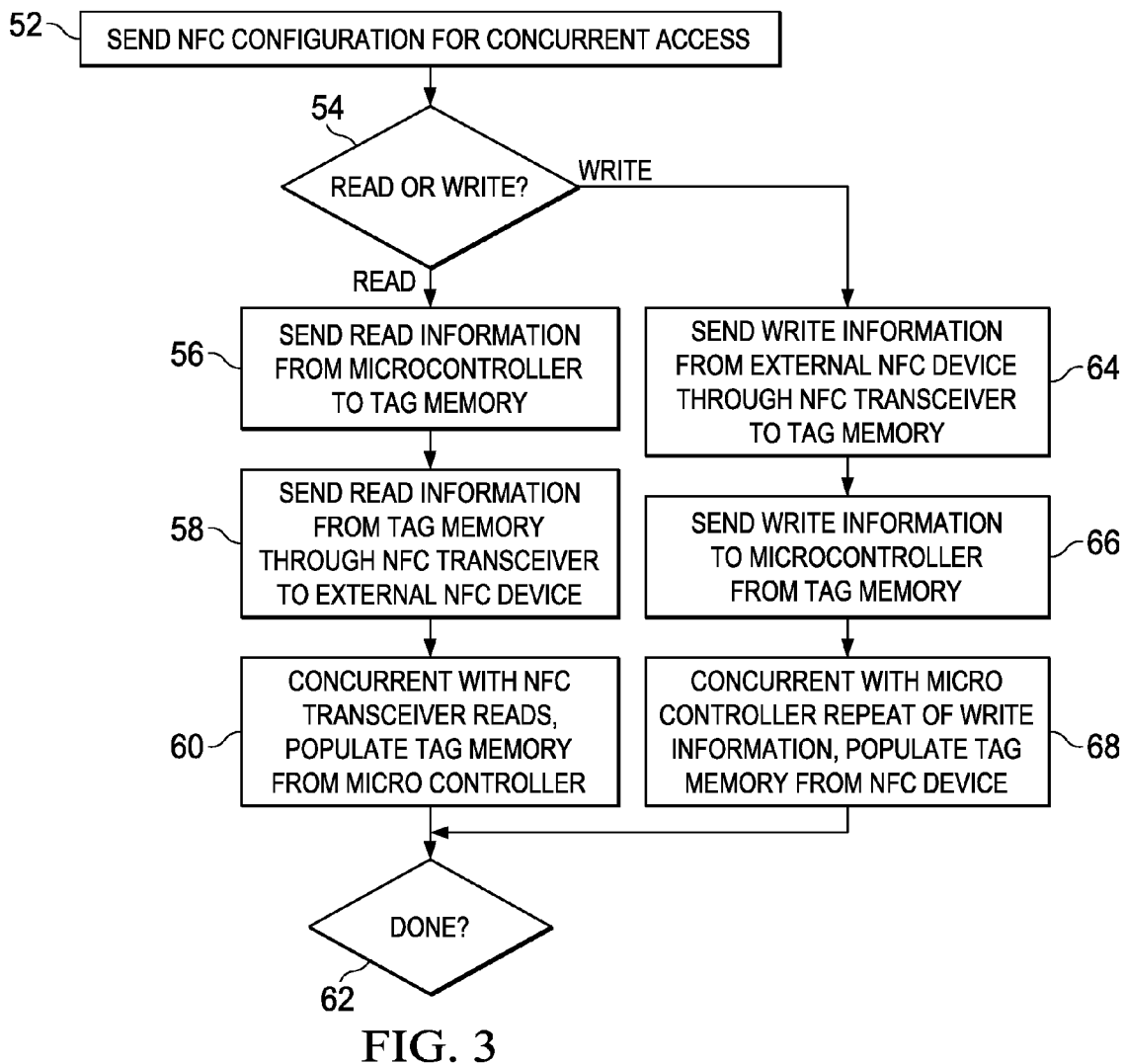
FIG. 3 depicts a flow diagram of a process that provides concurrent access of NFC tag memory for information transfers.

Referring now to FIG. 3, a flow diagram depicts a process that provides concurrent access of NFC tag memory for information transfers. The process starts at step 52 by sending NFC configuration information to an external NFC device that indicates concurrent access support, such as a flag or a tag memory size greater than the actual tag memory size. At step 54, a determination is made of whether a read or write transaction is requested that calls for concurrent access. If an external NFC device requests a read transaction, the process continues to step 56 to send read information from the microcontroller to the tag memory for communication of the read information to the external NFC device by the NFC transceiver at step 58. At step 60, concurrent with communication of the read information by the NFC transceiver from the tag memory, the microcontroller re-populates portions of the tag memory with additional read information so that the transceiver may continue rolling through tag memory repeatedly until the NFC read transaction is complete. At step 62, when the read transaction completes, the next transaction is made available.

If at step 54 a write NFC transaction is indicated, the process continues to step 64 to send the write information form the external NFC device through the NFC transceiver to the tag memory. At step 66, the write information stored in the tag memory is sent from the tag memory to the microcontroller as it is received by the NFC transceiver, thus freeing tag memory to accept additional write information. At step 68, concurrent with writes of information to the tag memory by the NFC transceiver, the microcontroller resets tag memory where information was transferred to the microcontroller so that the external NFC device can write to locations in the tag memory that have already been used in the NFC transaction. Thus, an external NFC device writes to the NFC transceiver based upon a tag memory size that is greater than the actual tag memory size and the microcontroller manages tag memory to reuse memory blocks during the write transaction. The result of concurrent writes and reads from a tag memory by both an NFC transceiver and microcontroller is a transition of tag memory into dual ported memory that allows for rolling NFC transactions cumulatively greater than available tag memory.

Figure 4:
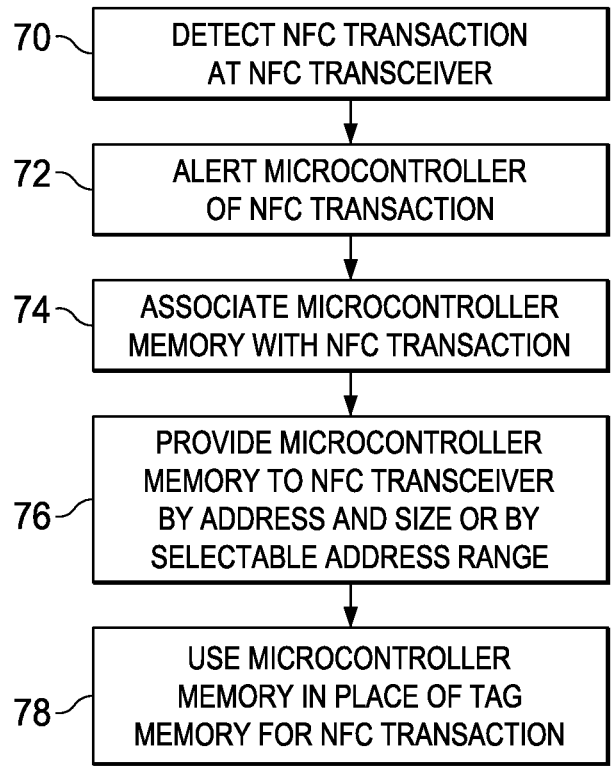
FIG. 4 depicts a flow diagram of a process that provides an NFC interface with support by memory external to tag memory.

Referring now to FIG. 4, a flow diagram depicts a process that provides an NFC interface with support by memory external to tag memory. At step 70, an NFC transaction is detected at an NFC transceiver so that read and write cues are enabled to effectively transition tag memory transactions to support sizes and rates unavailable with the use of just tag memory. Cues are also available to let other entities know that a read/write is being performed. For example, a cue notifies the microcontroller to read data so the microcontroller reads trail in a loop behind external NFC device writes. In the example embodiment of an external NFC device reading from a tag memory, the microcontroller can lead by writing new information in the memory while the external NFC device reads the tag memory in a trailing loop operation. At step 72, the NFC transceiver alerts the microcontroller of the pending NFC transaction. At step 74, microcontroller memory is associated with the NFC transaction to support transactions of greater than that available with tag memory. At step 76, the microcontroller memory for the NFC transaction is provided to the NFC transceiver for communication to the external NFC device, such as in the form of NFC configuration information. Microcontroller memory may be provided as a size of greater than the actual tag memory size, an addressed size to an address external to the tag memory, or by selectable address ranges. At step 78, the microcontroller memory is used to support the NFC transaction in the place of the tag memory so that the tag memory is not used in the NFC transaction. In alternative embodiments, tag memory may be used, such as in a rolling store that is reused as described above or as part of the addressed memory provided by the microcontroller.

Figure 5:
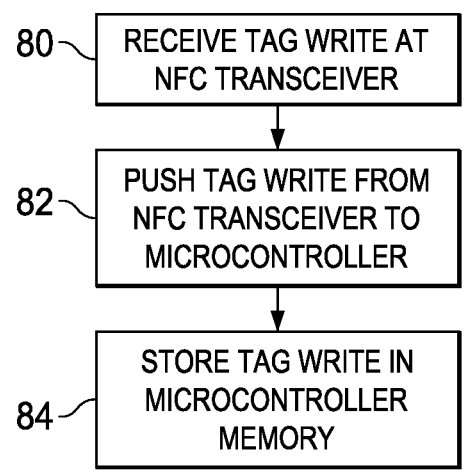
FIG. 5 depicts a flow diagram of a process that provides an NFC interface to receive a write without storage at the tag memory.

Referring now to FIG. 5, a flow diagram depicts a process that provides an NFC interface to receive a write without storage at the tag memory. In this write forwarding mode, when a tag is received at an NFC transceiver, the transceiver pushes the write address and data to a microcontroller selectable address range that provides memory beyond that available from the tag memory. At step 80, a tag write is received at the NFC transceiver. In one embodiment, the sending NFC device sends a tag that is greater than the tag memory of the receiving NFC device based upon a tag configuration provided by a microcontroller of the receive NFC device. The microcontroller manages information received by the NFC transceiver of the receiving NFC device to support NFC transactions of greater than the tag memory size. At step 82, the tag write is pushed from the NFC transceiver to the microcontroller so that the NFC transaction can accept a write of information greater than available tag memory space. The write forwarding may roll through tag memory so that tag memory is reused during the write or may proceed from the NFC transceiver buffer directly to the microcontroller. As step 84, the tag write is stored in the microcontroller memory or other memory accessible by the microcontroller.

Figure 6:
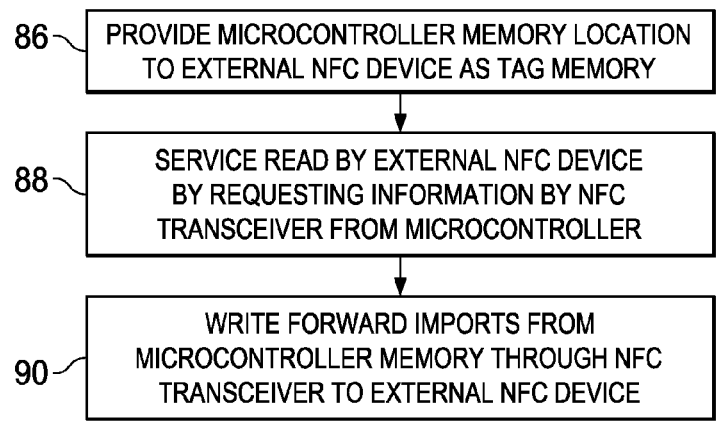
FIG. 6 depicts a flow diagram of a process that provides an NFC interface to send a write without storage at the tag memory.

Referring now to FIG. 6, a flow diagram depicts a process that provides an NFC interface to write information from a first NFC device to a second NFC device in response to a read request from the second NFC device without storage of the information at the tag memory. At step 86, a microcontroller memory location is provided as NFC configuration information from the first NFC device to the second NFC device, such as identified as the tag memory. The microcontroller memory location may be, for instance, a memory address and size or a range of addresses and sizes located in the microcontroller. At step 88, a read request by the second NFC device is serviced by requesting information by the NFC transceiver of the first NFC device from the microcontroller based upon the NFC configuration memory location. At step 90, information is written forward from the microcontroller memory to the NFC transceiver for communication to the second NFC device in response to the read request. In one embodiment, the microcontroller writes to the NFC transceiver buffer so that tag memory is not used for the forwarding of the information.

Figure 7:
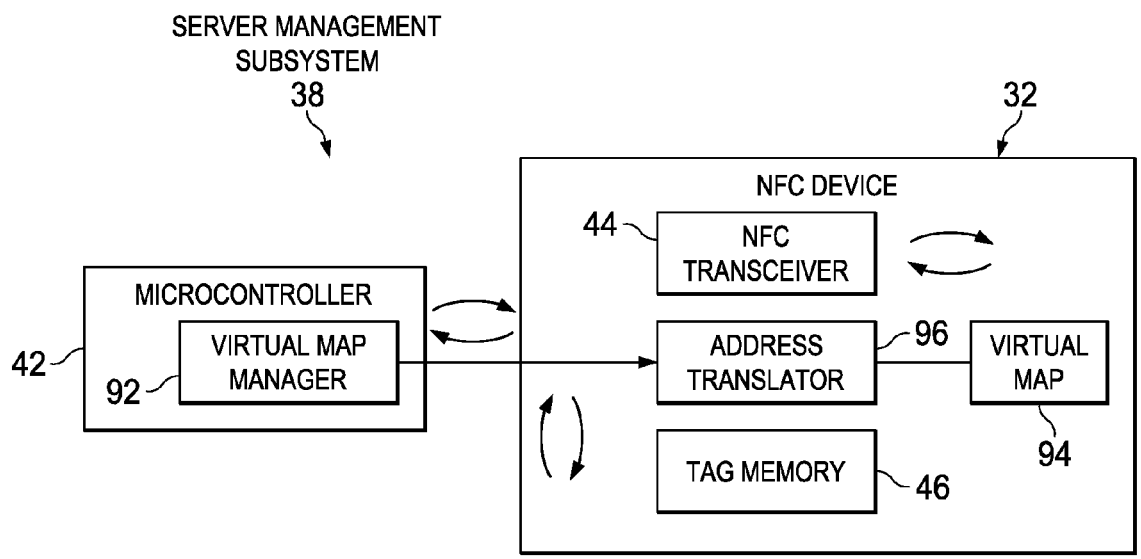
FIG. 7 depicts a block diagram of a server management subsystem that translates NFC transfers to memory external to tag memory by reference to a virtual map.

Referring now to FIG. 7, a block diagram depicts a server management subsystem 38 that translates NFC transfers to memory external to tag memory 46 by reference to a virtual map 94. Microcontroller 42 includes a virtual map manager 92 to remap blocks of physical tag memory 46 to a virtual address space tracked in virtual map 94. Virtual map manager 92 continually remaps blocks in cooperation with the read and write cues as set forth above to effectively create an infinitely sized tag. An address translator 96 operating in cooperation with NFC transceiver 44 ensures that information written from and read to NFC transceiver 44 based upon address locations of tag memory 46 comes from and is sent to the appropriate virtual locations.

Figure 8:
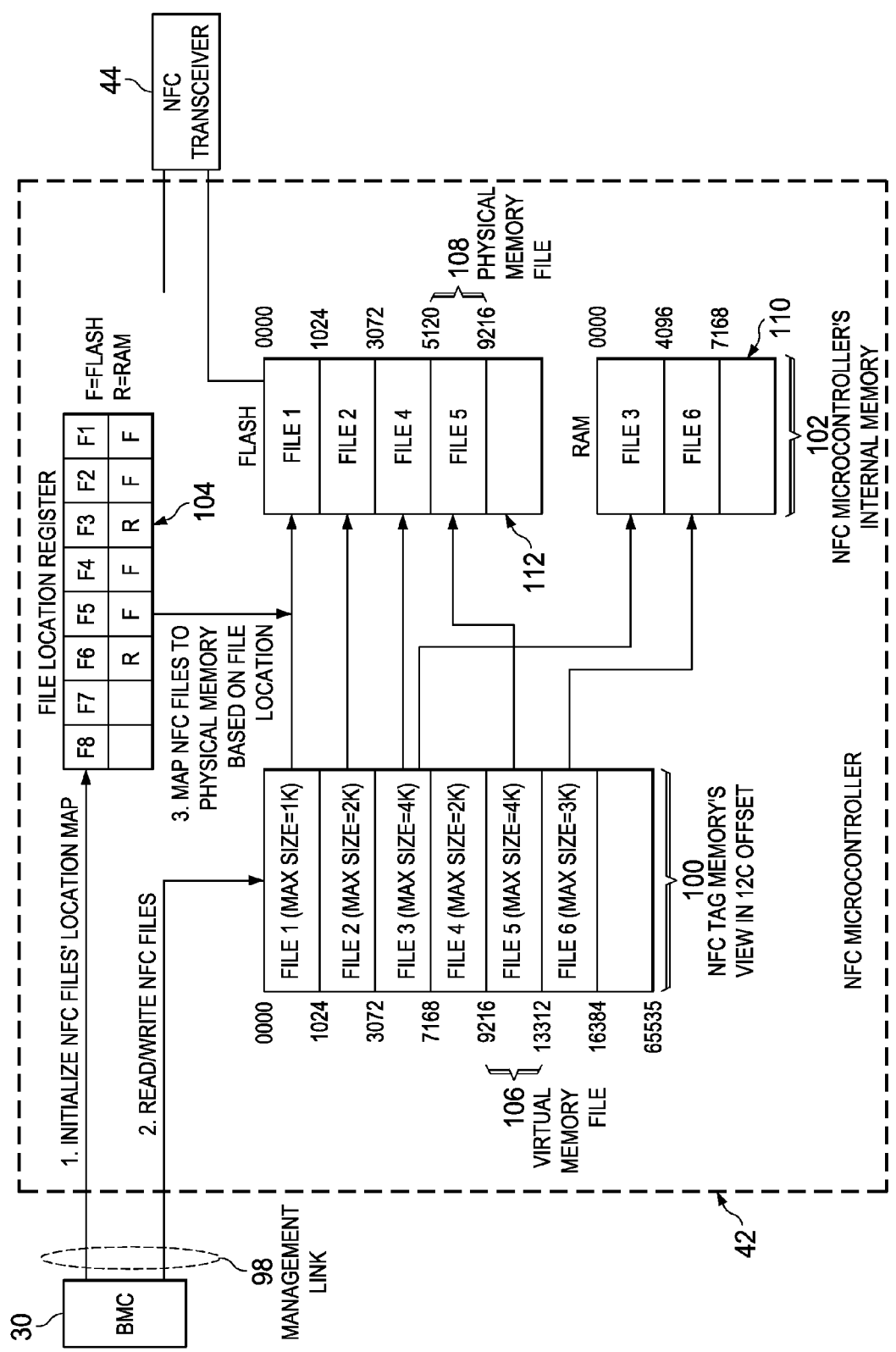
FIG. 8 depicts a block diagram of an example embodiment of memory mapping at an NFC microcontroller to transfer server management information between a server BMC and an external NFC device.

Referring now to FIG. 8, a block diagram depicts an example embodiment of memory mapping at an NFC microcontroller 42 to transfer server management information between a server BMC 30 and an external NFC device. BMC 30 interfaces with microcontroller 42 through a management link 98, such as an I2C link. BMC 30 obtains a virtual NFC tag memory view in I2C offset 100 that presents files with a virtual storage range and size. BMC 30 writes and reads management information at microcontroller 42 by reference to the virtual NFC tag memory view 100. Actual memory transactions are mapped from the virtual NFC tag memory view 100 to the microcontroller 42's internal physical memory 102 based upon a memory location definition set by a file location register 104, which maps each virtual memory files 106 to physical memory files 108. In the example embodiment, file location register 104 defines whether each virtual memory file maps to physical memory file 108 in non-persistent RAM 110 or in persistent flash memory 112. BMC 30 defines the file location register 104 values so that desired management information is stored in desired file locations. An external NFC device that has file location register 104 values, obtained ahead of time or with an NFC communication, is able to selectively download only desired files by identify the desired files in an NFC communication. For example, an application running on a mobile phone may include the file location register for a BMC and use the file location register to coordinate a more direct NFC transaction for desired information. Thus, in order to limit the time taken for an NFC transaction, a portable information handling system 12 identifies only the locations that are desired or selects specific files, such as by an address range associated with a file in the file location register, to have less than all available management information communicated in an NFC transaction.

In one embodiment, BMC 30 defines file locations in file location register 104 so that management information is stored in RAM 110 or flash 112 based upon the frequency of updates made to the management information. For example, basic identification information of server information handling system that changes infrequently, such as IP and MAC addresses and a server component inventory, are stored in flash 112, while more frequently updated information, such as error and operational logs for the server and health information and sub-system health on the server, are stored in RAM 110. This arrangement helps to prolong the life of microcontroller 42 and an associated NFC transceiver 44 by reducing wear at flash memory 112. Essentially, file location register 104 defines a partition between persistent and non-persistent memory so that microcontroller 42 acts as a virtual NFC tag memory with more frequently updated information stored in RAM 110 as the information is updated so that NFC transactions with most recent management information are available as updates are made without burnout of flash memory by repeated writes.

Figure 9:
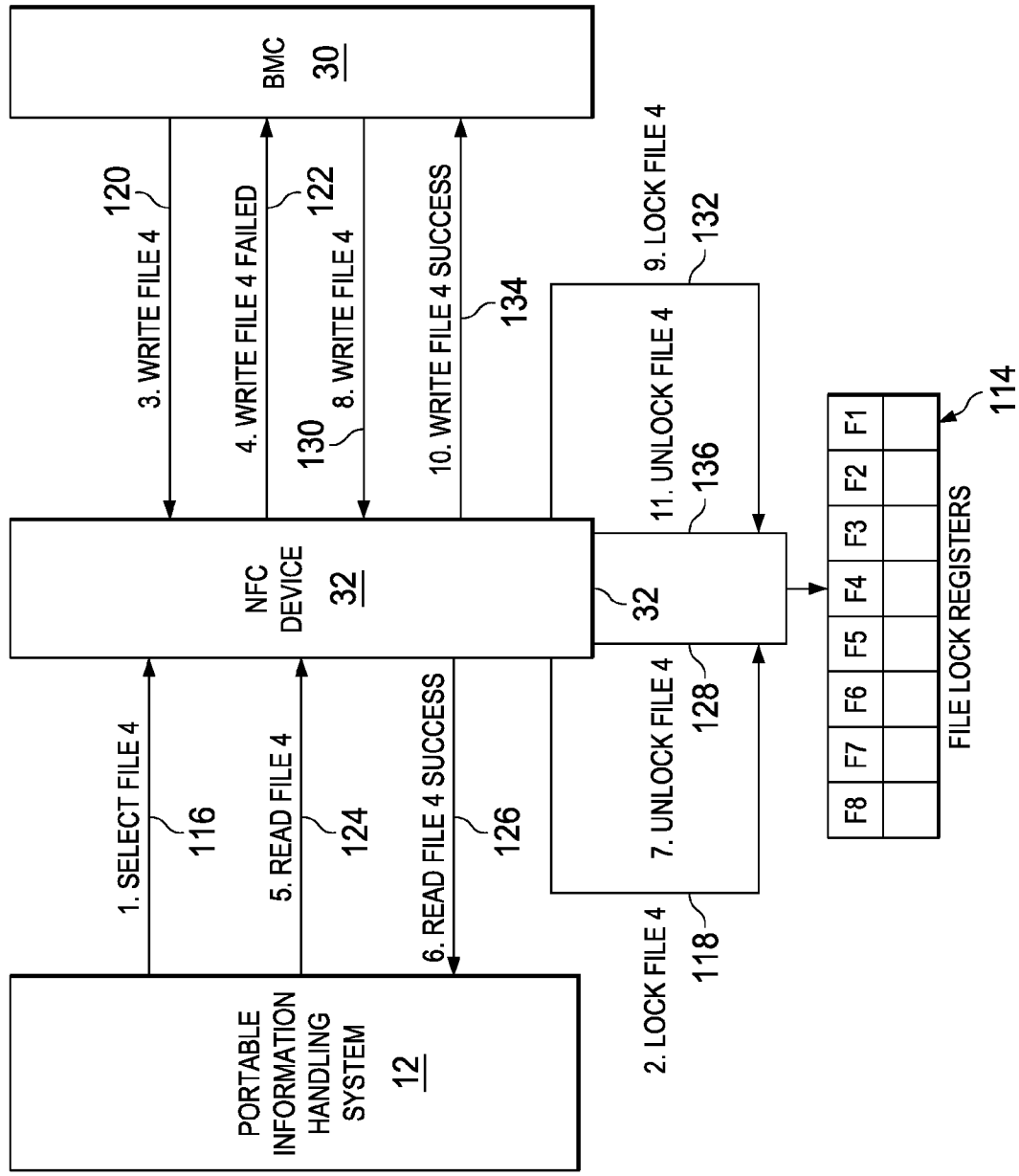
FIG. 9 depicts a functional block diagram of NFC transfers with data locked by microcontroller.

Referring now to FIG. 9, a functional block diagram depicts NFC transfers with data locked by a microcontroller disposed in an NFC device 32. Locking files during NFC transactions ensures concurrency of management data by preventing writes on data while the data is being transferred in response to a read request. In the example embodiment, the data request is initiated at step 116 from portable information handling system 12 to NFC device 32 disposed within a server management subsystem, however, in alternative embodiments, the data request is initiated from BMC 30. NFC device 32 at step 118 locks the requested file to prevent writes to the requested file. At step 120, BMC 30 attempts to write to the requested file, such as with a log update, and at step 122 a write fail is returned to BMC 30. At step 124, such as concurrent with the write attempt by BMC 30, portable information handling system 12 reads the requested file with an NFC transaction and, at step 126 a read success is returned. At step 128, the requested file is unlocked at the successful read so that, at step 130, a write request to the file by BMC 30 is accepted. In response to the BMC write request, at step 132 the requested file is locked and at step 134 a write success is returned to BMC 30. Finally at step 136, the requested file is unlocked to allow subsequent reads and writes.

Figure 10:
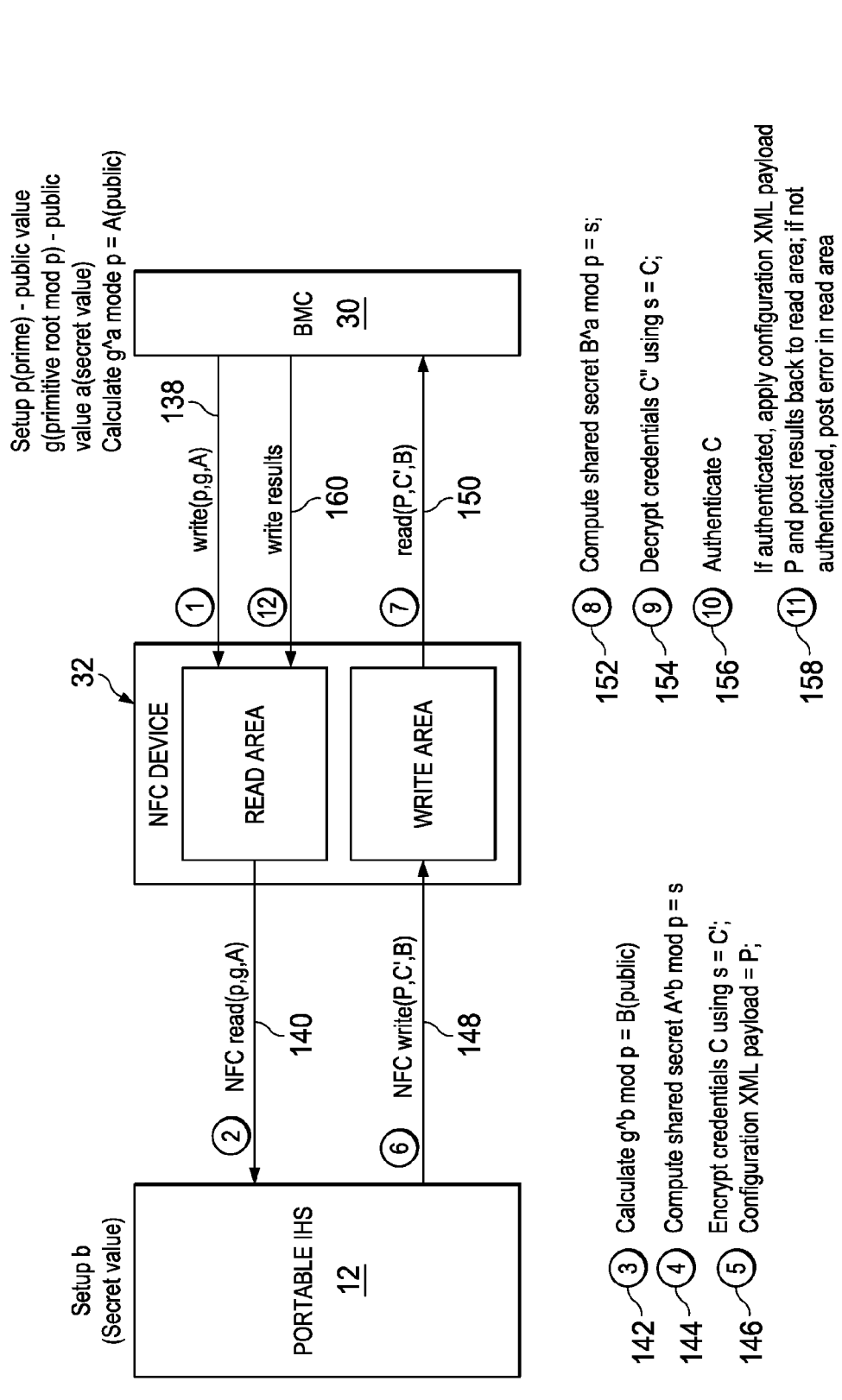
FIG. 10 depicts a functional block diagram of secure NFC transfers at a server BMC.

Referring now to FIG. 10, a function block diagram depicts secure NFC transfers at a server BMC 30. At initial setup, a secret value b is stored at portable information handling system 12, and two public values, p(prime) and g(primitive root mod p), and a secret value a are used at BMC 30 to calculate public value A. At step 138, BMC 30 writes values p,g and A to NFC device 32, and at step 140 an NFC transfer provides values p,g and A to portable information handling system 12. At step 142, portable information handling system 12 calculates public value B, at step 144, portable information handling system 12 computes shared secret value s and at step 146, portable information handling system 12 encrypts credentials C into C', such as an LDAP user name and password, using value s and configures an XML payload P. In one embodiment, sensitive information is encrypted and payload P is digitally signed. At step 148, portable information handling system 12 writes an NFC transaction to NFC device 32 with values P,C' and B. At step 150, BMC 150 retrieves values P, C' and B, and applies the values to compute the shared secret value s at step 152, to decrypt C' at step 154, to authenticate C at step 156, and, if C authenticates, to apply the configuration XML payload P and post results of the payload back to NFC device 32 by a write at step 160. Once the results are posted, portable information handling system 12 obtains the payload with an NFC transaction.

Although the present invention has been described in detail, it should be understood that various changes, substitutions and alterations can be made hereto without departing from the spirit and scope of the invention as defined by the appended claims.

What is claimed is:

1. An information handling system comprising:
a chassis operable to support processing components;
a processor disposed in the chassis and operable to execute instructions for processing information;
memory disposed in the chassis and interfaced with the processor, the memory operable to store the instructions and information;
a management controller disposed in the chassis and interfaced with the processor, the management controller operable to manage operational conditions associated with processing components within the chassis including at least the processor;
a near field communication (NFC) transceiver disposed in the chassis and operable to wirelessly communicate with an NFC device external to the chassis, the NFC transceiver having a tag memory that stores information to transmit to the external NFC device and information received from the external NFC device; and
a microcontroller interfacing the management controller with the near field communication transceiver, the microcontroller managing the tag memory to adapt the NFC transceiver communications to a selected one of plural data transfer modes including at least populating tag memory with data to replace data read from the tag memory as the data is read so that a tag memory read event provides an amount of data greater than the tag memory size.

2. The information handling system of claim 1 wherein the near field communication transceiver coordinates selection of a data transfer mode with the external NFC device by communicating a tag memory size that is different than the actual tag memory size.

3. The information handling system of claim 2 wherein the tag memory size comprises a virtual memory mapped to a physical address space external to the tag memory.

4. The information handling system of claim 3 wherein the virtual memory comprises a memory address and size for a predetermined range that the external NFC device interprets as the tag memory address and size.

5. The information handling system of claim 3 wherein the virtual memory comprises plural selectable address ranges, each of which is interpreted by the NFC device as the tag memory address range.

6. The information handling system of claim 1 wherein the plural data transfer modes comprise a dual ported mode having the microcontroller reading and writing a first portion of tag memory concurrently with the NFC transceiver reading and writing a second portion of tag memory.

7. The information handling system of claim 1 wherein the plural data transfer modes comprise a write forward mode having communication received at the NFC transceiver forwarded to a write address external to the tag memory without writing the communications to the tag memory.

8. The information handling system of claim 1 wherein the plural data transfer modes comprise a read forward mode having communications transmitted from the NFC transmitter by forwarding information from a read address external to the tag memory without storing the information in the tag memory.

9. A method for communication of information to a server information handling system management controller from an external information handling system having a near field communication (NFC) device, the method comprising:
exchanging NFC configuration information between the external NFC communication device and an NFC transceiver disposed in the server, the NFC transceiver having a tag memory, the configuration information including tag memory configuration information of the tag memory of the NFC transceiver indicating a selected one of plural data transfer modes; and
communicating information between the external NFC communication device and the NFC transceiver according to the selected one of plural data transfer modes as indicated by the tag memory configuration information;
wherein the selected one of plural data transfer modes include at least a tag memory size greater than the NFC transceiver tag memory, the data transfer mode adding data to the tag memory as data is read from the tag memory.

10. The method of claim 9 wherein the tag memory configuration information comprises a tag memory size that is different than the actual tag memory size associated with the NFC transceiver.

11. The method of claim 10 wherein the tag memory size comprises a virtual memory mapped to a physical address space external to the tag memory.

12. The method of claim 11 further comprising:
interpreting the virtual memory at the external NFC communication device as the tag memory;
writing information to the virtual memory with the external NFC communication device as a tag memory write; and
sending the write information from the NFC transceiver to a microcontroller for writing to memory outside of the tag memory.

13. The method of claim 12 wherein sending the write information further comprises sending the write information from the external NFC communication device to the microcontroller without storing the information in the tag memory.

14. The method of claim 11 further comprising:
interpreting the virtual memory at the external NFC communication device as a tag memory;
reading information from the virtual memory with the external NFC communication device as a tag memory; and
sending the read information from a memory external to the tag memory, to a microcontroller, to the NFC transceiver and by an NFC communication to the external NFC communication device.

15. The method of claim 14 wherein sending the read information further comprises sending the read information from the microcontroller to the external NFC communication device without storing the read information in the tag memory.

16. A system for NFC transfers of information, the system comprising:
a portable information handling system having an NFC communication device and an NFC application stored in non-transitory memory, the NFC application operable to command the NFC communication device to send information to another NFC communication device according to configuration information shared with the other NFC communication device; and
a server baseboard management controller operable to manage operations of a server information handling system and having an NFC transceiver operable to communicate information stored in a tag memory, the NFC transceiver managed by a microcontroller;
wherein the microcontroller manages configuration information sent to the NFC communication device to represent the tag memory with configuration information that differs from the actual configuration of the tag memory, the configuration information including at least a tag memory size greater than the actual tag memory size of the NFC transceiver tag memory, the microcontroller writing information into the tag memory as information is read from the tag memory so that the amount of information provided by a tag memory read exceeds the amount of information stored in the tag memory at the start of the tag memory read.

17. The system of claim 16 wherein the actual tag memory configuration is a first memory size and the represented tag memory is greater than the actual memory size.

18. The system of claim 16 wherein the actual tag memory configuration is a memory location and the represented tag memory location is external to the actual tag memory.

19. The system of claim 16 further comprising a memory map managed by the microcontroller to dynamically remap memory locations of the tag memory for concurrent reads and writes sequentially performed through the tag memory addresses.

20. The system of claim 16 wherein the microcontroller is further operable to coordinate storage of information in association with NFC transfers by the NFC transceiver by use of memory external to the tag memory and without storing the information in the tag memory.

* * * * *